Jan. 12, 1960  R. J. GIRERD  2,920,616
FEEDING GAG
Filed Jan. 26, 1959
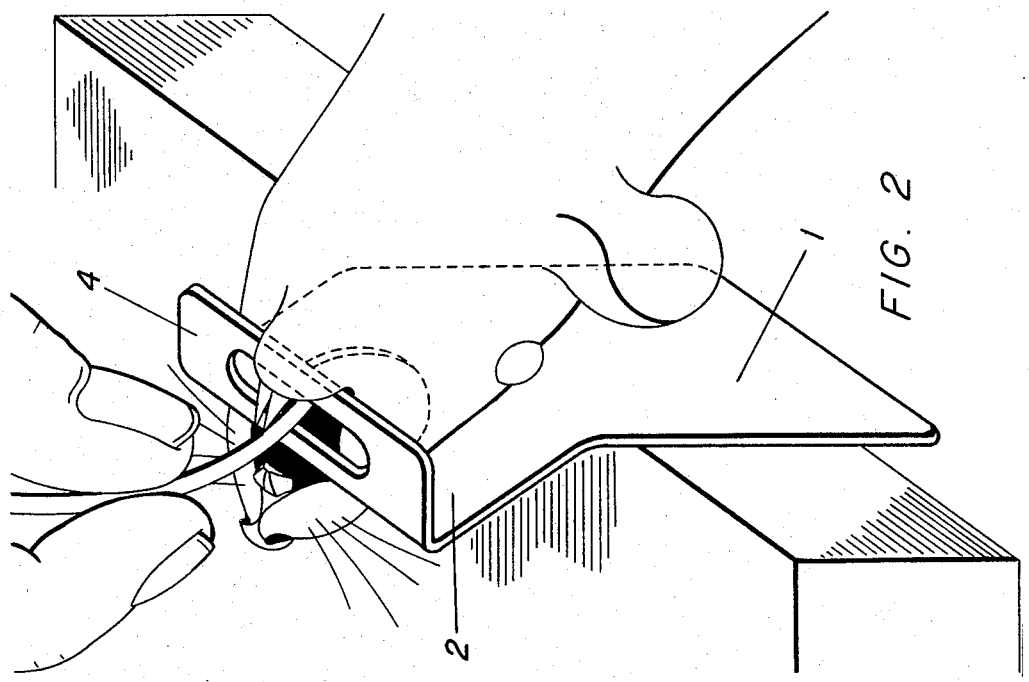
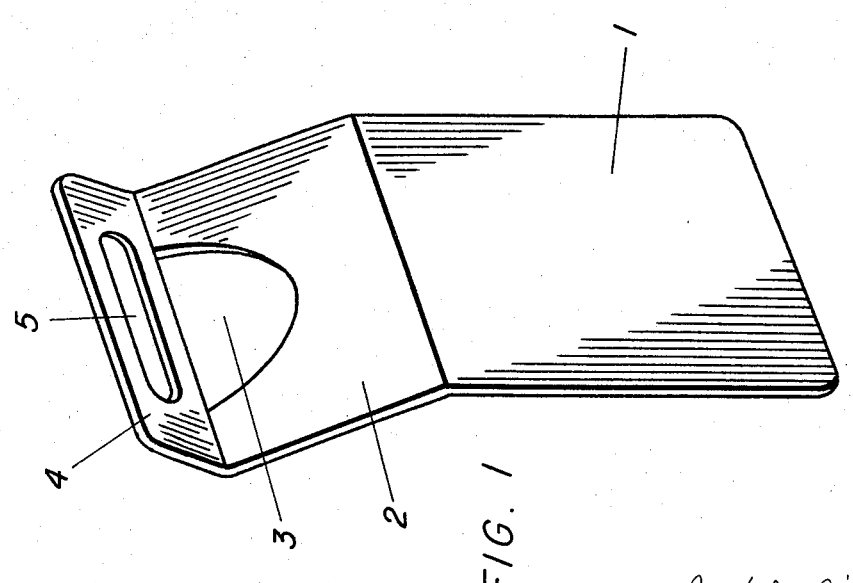
René J. Girerd
INVENTOR

United States Patent Office 2,920,616
Patented Jan. 12, 1960

2,920,616
FEEDING GAG

René J. Girerd, Morristown, N.J.

Application January 26, 1959, Serial No. 788,913

2 Claims. (Cl. 128—12)

This invention relates to a new and improved gag for animals suitable for use in introducing a probe or a cathether in the digestive tract of the animals held in said gag.

An object of this invention is to provide an improved gag having novel features of design and construction and exhibiting advantages in the ease and simplicity of its operation as well as in safety to an animal held therein when the animal is to be forced-fed or to receive treatment intragastrically.

Other objects of this invention will appear from the following detailed description.

The present invention enables a single person to hold the jaws of a rodent, or other animal, open and to maintain the jaws separated so that the catheter or feeding tube may readily be introduced into the oral end of the digestive tract without causing injury to or other unpleasant reactions in the said animal.

The gags hitherto available for the force feeding or oral treatment of small animals have normally required two people to apply the gag and to carry out the desired feeding step. The difficulty of the operation frequently resulted in injury either to the personnel or to the animal because of the difficulty in preventing the animal from biting and from causing damage to the catheter or feeding tube as well as injury to the operator.

These, and other objects are attained by this invention as will be apparent from the following detailed description and the accompanying drawing which forms a part of this application.

In the drawings:

Figure 1 is a perspective view of the gag;
Figure 2 illustrates the manner of use of said gag.

Referring to the drawing more particularly by reference numerals, 1 represents a flat plate portion of said gag attached to and integral with an angularly offset portion 2. The said portion 2 is provided with a large semi-ovoid opening 3 designed to receive and fit around the snout of the animal in said gag, thereby substantially immobilizing the said snout. Attached to and integral with said portion 2 is the gag portion 4 which comprises an angularly offset lip adapted to fit between the animal's jaws. The said gag portion 4 includes substantially intermediate of its ends a small elongated hole 5 which serves as a guide for the catheter and through which the said catheter is introduced. The angle between portion 2 and portion 4 is so arranged as to give the proper and correct anatomical positioning of the animal's head together with a satisfactory separation of the animal's jaws. The plate portion 1 of the gag is normally held vertically as shown and can be firmly maintained between the back of the operator's hand holding the animal and the edge of a table or laboratory bench, for instance, as illustrated in Figure 2. Too rigid a mounting for said gag on a table, or the like, may result in injury to nervous or excited animals. A spring mounting may be employed if a permanent or semi-permanent mount is desired.

Preferably the gag is made of a plate to hard non-oxidizable metal suitable for sterilization such as stainless steel or may be molded of a reinforced thermosetting resin. All edges and angles are preferably smooth so as not to cause any injury to the animal.

It is understood that the foregoing detailed description is given merely by way of illustration and that many variations may be made therein without departing from the spirit of my invention.

Having described my invention, what I desire to secure by Letters Patent is:

1. An animal gag permitting safe and easy access to the oral and pharyngeal cavities of animals, comprising a substantially rectangular plate having an opening adapted to receive the snout and upper jaw of an animal, a lip integral with said plate and at an angle thereto, said lip being provided with an opening and positioned to be held between the upper and lower jaw of an animal held therein, and means attached to said plate portion for supporting said gag assembly when in use.

2. A device in accordance with claim 1 wherein said supporting means is a handle comprising a continuation of the plate portion.

References Cited in the file of this patent

UNITED STATES PATENTS

| | | |
|---|---|---|
| 1,311,409 | McAlister | July 29, 1919 |
| 2,041,034 | Rosenberg | May 19, 1936 |